United States Patent
Lee et al.

(10) Patent No.: US 11,599,173 B2
(45) Date of Patent: Mar. 7, 2023

(54) INTERNET OF THINGS SYSTEM

(71) Applicant: TAIWAN OASIS TECHNOLOGY CO., LTD., New Taipei (TW)

(72) Inventors: Wei-Long Lee, New Taipei (TW); Shih-Meng Liao, New Taipei (TW)

(73) Assignee: TAIWAN OASIS TECHNOLOGY CO., LTD., New Taipei (TW)

( * ) Notice: Subject to any disclaimer, the term of this patent is extended or adjusted under 35 U.S.C. 154(b) by 175 days.

(21) Appl. No.: 17/126,197

(22) Filed: Dec. 18, 2020

(65) Prior Publication Data

US 2021/0103322 A1    Apr. 8, 2021

Related U.S. Application Data

(63) Continuation-in-part of application No. 16/354,334, filed on Mar. 15, 2019, now Pat. No. 10,904,990.

(51) Int. Cl.
*G06F 1/26*       (2006.01)
*H04L 12/66*    (2006.01)
*G16Y 10/75*   (2020.01)

(52) U.S. Cl.
CPC ............ *G06F 1/266* (2013.01); *G16Y 10/75* (2020.01); *H04L 12/66* (2013.01)

(58) Field of Classification Search
CPC ... G06F 1/266; G06F 1/24; G06F 1/28; G06F 1/305; G06F 1/3209; G06F 1/3287; G16Y 10/75; H04L 12/66; H04L 12/413; H04L 12/281; H04L 12/2827; H04L 12/12; Y02D 10/00; Y02D 30/50

USPC ....................................................... 340/12.23
See application file for complete search history.

(56) References Cited

U.S. PATENT DOCUMENTS

| | | | | |
|---|---|---|---|---|
| 9,313,863 B2* | 4/2016 | Hershberg | ........... | H04L 67/125 |
| 9,655,217 B2* | 5/2017 | Recker | .................. | H05B 47/16 |
| 9,860,965 B2* | 1/2018 | Recker | ................ | H05B 47/105 |
| 9,949,231 B2* | 4/2018 | Kim | .................... | H04W 64/006 |
| 10,097,529 B2* | 10/2018 | Kang | ...................... | H04L 63/10 |
| 10,321,182 B2* | 6/2019 | Herz | .................. | G06F 3/04883 |
| 10,388,159 B2* | 8/2019 | Yi | ............................ | B60N 2/56 |
| 11,410,537 B2* | 8/2022 | Hariz | .................. | H05B 47/235 |
| 2022/0117505 A1* | 4/2022 | Harel | ................. | A61B 5/02416 |

* cited by examiner

*Primary Examiner* — Omar CasillasHernandez
(74) *Attorney, Agent, or Firm* — Demian K. Jackson; Jackson IPG PLLC

(57) ABSTRACT

An Internet of Things (IoT) system is illustrated, which has a power supply device and an IoT device. The power supply device electrically connected to the IoT device provides power to the IoT device. The IoT device has a memory unit, a control unit and a networking unit. When the power device generates a surge configuration, the control unit executes a surge control command stored in the control unit after receiving the surge configuration. The surge control command drives the control unit selectively executes one of modes according to the surge configuration. The modes comprise a user mode and a reset mode. The present disclosure utilizes the surge configuration to restart and/or reset the IoT device, and thus the IoT device can be reset without installing a reset button.

17 Claims, 5 Drawing Sheets

INTERNET OF THINGS SYSTEM

CROSS REFERENCE

The present invention is Continuation-in-part application of U.S. patent application Ser. No. 16/354,334 filed on 2019 Mar. 15, wherein all contents of the references which priorities are claimed by the present invention are included in the present invention, herein.

BACKGROUND

Technical Field

The present disclosure relates to an Internet of Things (IoT) system, in particularly, to the IoT system having an IoT device which can selectively execute one of modes according to a surge configuration after receiving a surge from a power supply device.

Related Art

Internet of Things is a network based on information carriers of Internet and a communication network, and makes devices be independently addressed and communicate with each other. By IoT, the machines, apparatuses and people can be centrally managed and controlled, home appliances and cars can be monitored, and IoT can be applied in applications, such as location finding and thievery prevention of items.

Recently, with development and popular utilization of IoT, generally used devices which independently performs their original functions can further have networking functions, and thus applications of kinds can be implemented, such as lighting devices and home appliances can link to Internet to form IoT to bring life and generation convenience to people. However, related products still require cumbersome installation steps and information inputs, and such installations are not friendly to general users.

For example, an IoT device is implemented as a water pump being disposed near a water storage pool outside a house, and a power switch of the water pump is usually disposed in the house. When a controller or a networking unit of the water pump gets a crash, the user must go outside the house to push the reset button of the water pump to reset the controller or the networking unit. For another example, an IoT device is implemented as a lighting device mounted to a ceiling. When a controller or a networking unit of the lighting device gets a crash, the user must climb to the ceiling to push the reset button of the lighting device to reset the controller or the networking unit. The above two situations actually cause unfriendliness and safety issues to the users when resetting the IoT devices.

SUMMARY OF THE INVENTION

Accordingly, the present disclosure provides an IoT system which utilizes a surge configuration to restart or reset an IoT device of the IoT system, such that it brings friendliness and convenience to a user for using the IoT device.

To achieve one of the above objectives, the IoT system at least comprises a power supply device and an IoT device. The power supply device supplies power to the IoT device via a wired manner or a wireless manner, the IoT device comprises a memory unit, a control unit and a networking unit, wherein the control unit is electrically connected to the memory unit and the networking unit, and the a memory unit stores multiple modes. When the power supply device or an interference device electrically connected to the power supply device generates a surge configuration, the power supply device or the interference device transmits the surge configuration to the control unit, and the control unit executes a surge control command stored in the control unit after receiving the surge configuration, wherein the surge control command drives the control unit to selectively execute one of the modes according to the surge configuration.

The IoT system executes a restarting method of the IoT device to restart the IoT device, and the restarting method of the IoT device comprises the following steps: a step of generating surge and a step of selecting one of modes.

DESCRIPTIONS OF DRAWINGS IN THE INVENTION

DESCRIPTIONS OF EMBODIMENTS IN THE INVENTION

Embodiments of the present disclosure will now be described, by way of example only, with reference to the accompanying drawings. The following drawings are dedicated for description, and they are schematic and exemplary, being not drawn and precisely allocated in accordance with the actual ratio, thus not limiting the present disclosure.

An IoT device in the present disclosure is a thing of any kind (such as, an equipment or a sensor) having an addressable communication interface (such as, a communication interface of Internet addressing, Bluetooth identification, near field communication (NFC)) which can transmits information to one or more other devices via a wireless or wired link. The IoT device of the present disclosure can have a passive communication device interface, such as a quick response (QR) code, a radio frequency identification (RFID) tag, a NFC tag or other similar one. Or alternatively, the IoT device of the present disclosure can have an active communication device interface, such as a modem, a transceiver or other similar one. The IoT device of the present disclosure can be a power device, a lighting device, a security device, an air condition device, a home appliance, an audio-visual entertainment device or other monitor device with one or more sensors for sensing a motion, a sound, an image, a temperature, a humidity, an air pressure, a gas and/or a ultraviolet light. For example, the IoT device of the present disclosure can comprises one of a refrigerator, a bread machine, an oven, a microwave, a freezer, a dishwasher, a plate, a hand tool, a washing machine, a dryer, a stove, an air conditioner, a thermostat, a TV, a lamp, a vacuum cleaner, a sprinkler, an electricity meter, a gas meter and so on. That is, the IoT device of the present disclosure is the thing having the addressable communication interface for IoT communication, and the kind of IoT device of the present disclosure is not intended to limit the present disclosure.

Figure 1:
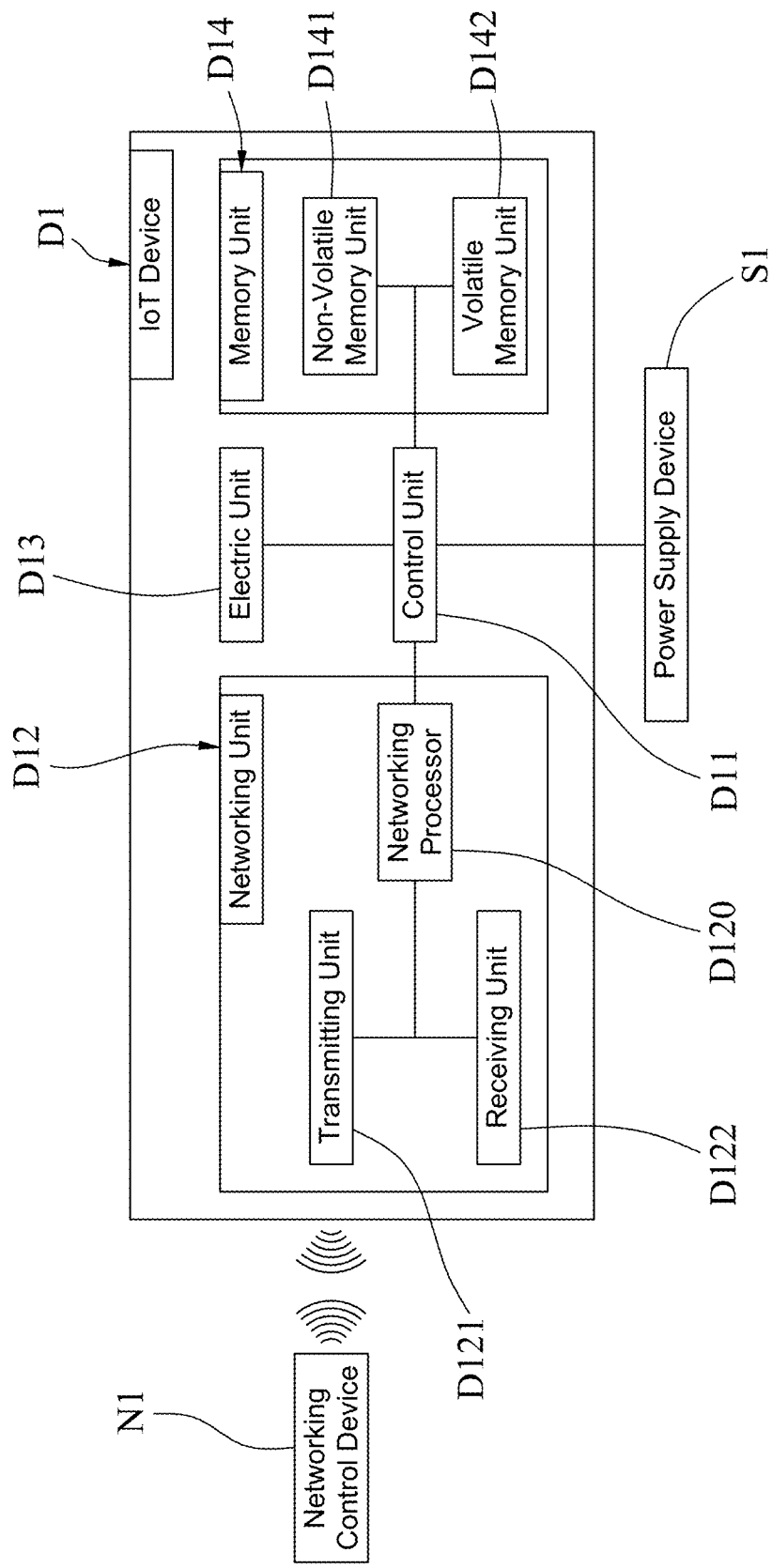
FIG. 1 is a configuration block diagram of an IoT system of the present disclosure.

Next, refer to FIG. 1. An IoT system comprises a power supply device (S1) and an IoT device (D1). The power supply device (S1) is electrically connected to the IoT device (D1), and thus the power supply device (S1) provides power to the IoT device (D1) via a wired manner or a wireless manner. The IoT device (D1) comprises a control unit (D11), a networking unit (D12), an electric unit (D13) and a memory unit (D14). The memory unit (D14) is electrically connected to the control unit (D11), the memory unit (D14) has a non-volatile memory unit (D141) and a volatile memory unit (D142), the control unit (D11) is electrically connected to the non-volatile memory unit (D141) and the volatile memory unit (D142), and the memory unit (D14) stores a setting process, setting information and modes in the non-volatile memory unit (D141). The control unit (D11) is electrically connected to the power supply device (S1) via a wired manner or a wireless manner, and the power from the power supply device (S1) can drive the control unit (D11) to execute a first command stored in the control unit (D11), and to store a first result in the volatile memory unit (D142) after the first control command is executed. For example, the control unit (D11) acquires the setting process and the setting information in the non-volatile memory unit (D141) to execute the first command, and stores the first result in the volatile memory unit (D142) after the first control command is executed.

The control unit (D11) is electrically connected to the electric unit (D13), and thus the control unit (D11) can execute the first control command to provide the full power, the partial power or none of the power to the electric unit (D13), so as to control operation of the electric unit (D13). For example, the electric unit (D13) is a lamp, the control unit (D11) provides the full power, the partial power or none of the power to the lamp, and thus the lamp is fully bright, half bright or off.

The control unit (D11) is electrically connected to the networking unit (D12), and the networking unit (D12) comprises a networking processor (D120), a transmitting unit (D121) and a receiving unit (D122). The networking processor (D120) is electrically connected to the control unit (D11), the transmitting unit (D121) and the receiving unit (D122). The networking processor (D120) executes the first control command from the control unit (D11), and generates transmitting information (or upload information) of the first control command to the transmitting unit (D121). By using the transmitting unit (D121), the transmitting information is transmitted to exterior via a transmitting manner, for example, the transmitting unit (D121) transmits the transmitting information to a networking control device (N1) via the transmitting manner, and the transmitting information comprises information of the first result. Via a receiving manner, the receiving unit (D122) receives receiving information (or download information) from the networking control device (N1) disposed at the exterior, and transmits the receiving information to the networking processor (D120). Next, the networking processor (D120) converts the receiving information into a second control command, and the second control command is transmitted to the control unit (D11). Then, the control unit (D11) executes the second control command, and stores a second result in the volatile memory unit (D142) or the non-volatile memory unit (D141) of the memory unit (D14) after the second control command is executed. The second result is a user mode, and the user mode comprises the user setting process and the user setting information. Furthermore, the control unit (D11) can execute the second control command to provide the full power, the partial power or none of the power to the electric unit (D13), so as to control the operation of the electric unit (D13). For example, the electric unit (D13) is a lamp, the control unit (D11) provides the full power, the partial power or none of the power to the lamp, and thus the lamp is fully bright, half bright or off. For example, the user setting process comprises a user name and an address (such as, media access control (MAC) address of a mobile phone) of the networking control device (N1) for identifying a network device location, and the user setting information is to provide 30% of the power so that the brightness of the bulb is 30% at full brightness (100% power).

The receiving manner and the transmitting manner are independent to each other, and each of them can be a Wi-Fi communication protocol, a 3G communication protocol, a 4G communication protocol, a 5G communication protocol, Bluetooth® or NFC. The networking control device (N1) can be a smart phone, a pad computer, a notebook, a smart wearable device, a cloud server, a database server, an application program server, a workstation, a personal computer or other computing device having a computing ability.

Figure 2:
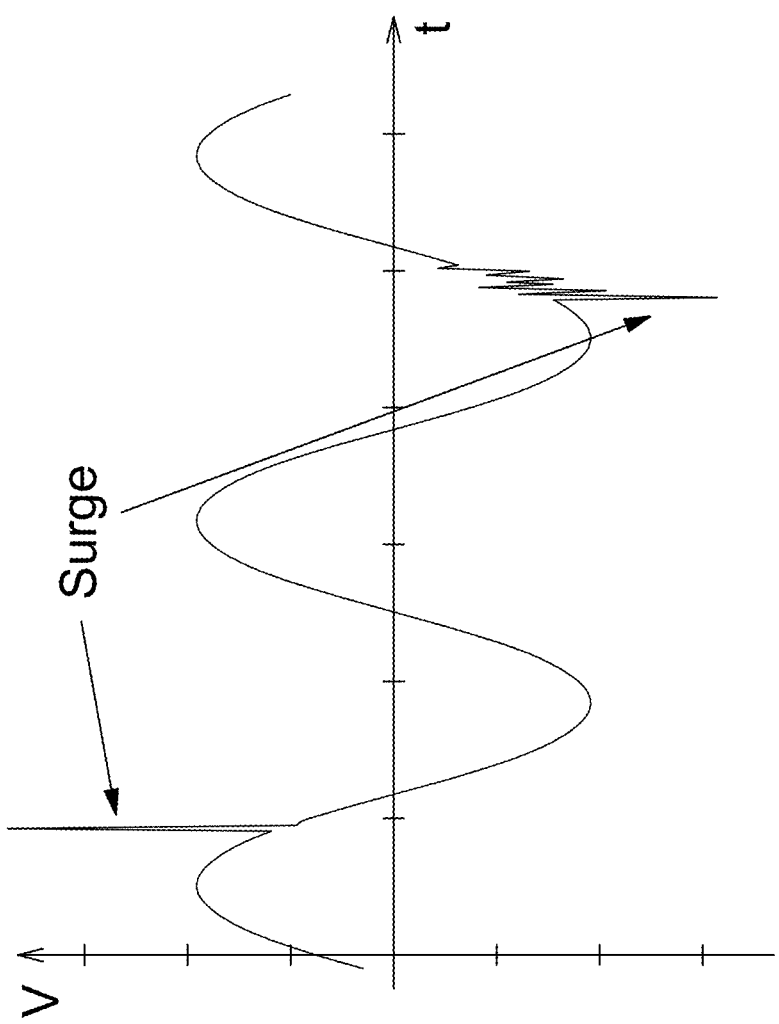
FIG. 2 is a schematic diagram showing a surge of a voltage of the present disclosure, wherein a vertical axis represents a voltage level and a horizontal axis represents time.
Figure 3:
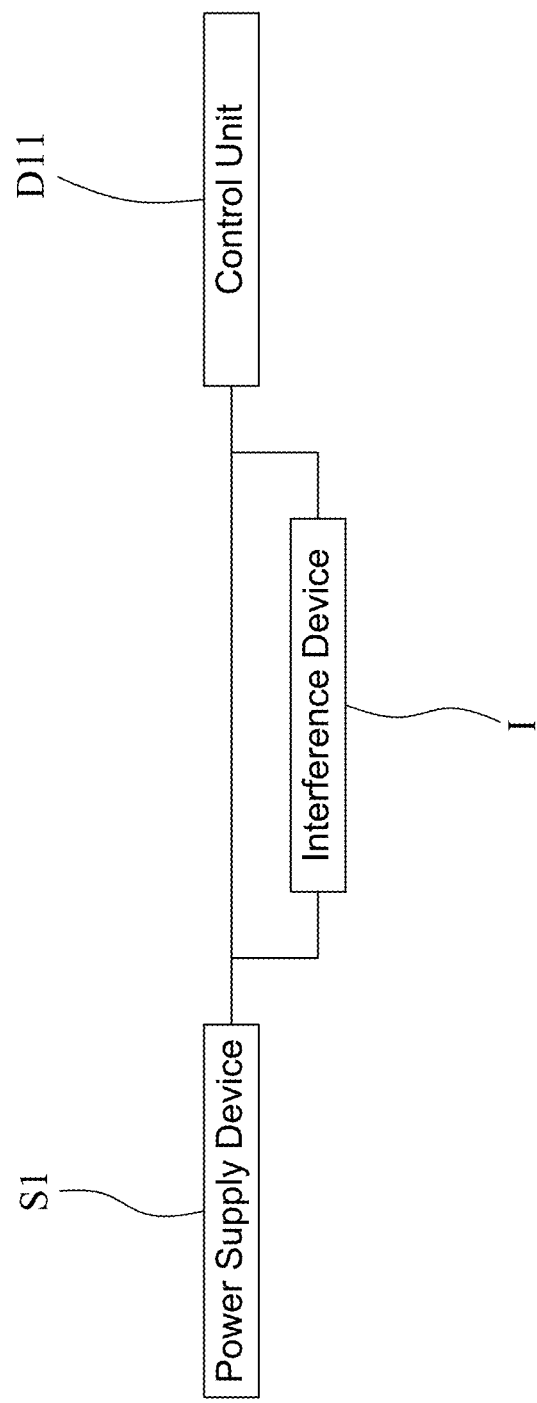
FIG. 3 is a configuration block diagram of an IoT device installed with an interference device of the present disclosure.

When the power supply device (S1) generates a surge configuration, the power supply device (S1) transmits the surge configuration to the control unit (D11), and the control unit (D11) receives the surge configuration. After the surge configuration is received by the control unit (D11), the control unit (D11) executes a surge control command stored in the control unit (D11). The surge control command drives the control unit (D11) to selectively execute one of the modes according to the surge configuration, wherein the selected mode is corresponding to the surge configuration. The surge configuration can be a combination of one or more surges. The surge can be a switch surge, or a fast and short-duration transient voltage signal (voltage surge, see FIG. 2) or a fast and short-duration transient current signal (current surge). When the power supply device (S1) switches the control unit (D11) from a power supplying state to a non-power supplying state, or when the power supply device (S1) switches the control unit (D11) to the power supplying state from the non-power supplying state, the switch surge is generated. For example, the power supply device (S1) is a power switch, a power plug, a power socket, a wire connected to the power source, or a Power over Ethernet (PoE) device. Please refer to FIG. 3, the voltage surge or the current surge may be generated by an interference device (I) electrically connected to the power supply device (S1). The interference device (I) can use an external device to cause the interference device (I) to generate the voltage surge or the current surge by electromagnetic induction, thus generating the surge configuration. In particular, the surge referred to in the present disclosure can also be understood as "spike".

The modes at least include the user mode and a reset mode. When the surge configuration is that there is only a preset number of surges in a preset time period, the surge control command drives the control unit (D11) to selectively execute the user mode among the modes. For example, the surge configuration is such that there are only two surges within the preset time period of 1 second, and the power switch is only turned off (from ON to OFF) once and turned on once (from OFF to ON) within 1 second. The preset number of the surges is two of the surges; or alternatively, the interference device (I) only generates one of the voltage surge or one of the current surge within 1 second, and the preset number of the surges is one of the surge. When the surge control command executes the user mode and generates a fault message, the surge control command drives the control unit (D11) to automatically execute another one of the modes except for the user mode according to the fault message, for example, the reset mode. When the surge control command drives the control unit (D11) to execute the user mode (the user name, the MAC address of the mobile phone, provide 30% of the power), if the control unit (D11) cannot provide 30% of the power but provide 50% of the power, the surge control command of the control unit (D11) will generate the fault message, and then the surge control command drives the control unit (D11) to automatically execute the other one among the modes except for the user mode according to the fault message, such as the reset mode. The aforementioned "automatically" means that the fault message can be a fault code (for example, Code 02), and the surge control command executes the other one of the modes except for the user mode according to the fault code, such as the reset mode. Of course, preferably, there are fault messages corresponding to fault codes. In particular, although the surge control command of the control unit (D11) generates the fault message, the control unit (D11) will continue to execute the user mode until the surge control command drives the control unit (D11) to complete execution of the other one mode (such as, the reset mode), and then the control unit (D11) will terminate the execution of the user mode. For example, the surge control command of the control unit (D11) generates the fault message (the error code is Code 02), and the surge control command drives the control unit (D11) to continuously execute the user mode (the user name, a MAC address of the mobile phone, provide 30% of the power, but actually 50% of the power), in other words, the control unit (D11) continuously provides 50% of the power to the electric unit (D13) until the surge control command drives the control unit (D11) to complete the execution of the reset mode, and then the control unit terminates to provide 50% of the power. In this way, during the time when the control unit (D11) executes the reset mode, the light bulb still provides 50% of the lighting brightness for the user to operate the mobile phone, and avoids the lack of indoor brightness which causes the user to collide with furniture. Specifically, the values of the preset number are stored in the memory unit (D14). Preferably, the values of the preset number are included in the first result or the second result.

In another embodiment, when the surge configuration is such that there is not the preset number of the surges in the preset time period, the surge control command drives the control unit (D11) to selectively execute the other one of the modes except for the user mode. For example, when the surge configuration has the surges of a number more than the preset number within the preset time period, the surge control command drives the control unit (D11) to selectively execute the other one of the modes except for the user mode. For example, the preset number of the surges is two, the surge configuration is to continuously generate four surges within the preset time period of 1 second, the power switch is repeatedly turned off and on once within 1 second, and the surge control command drives the control unit (D11) to selectively execute the other one of the modes except the user mode, such as the reset mode. Or alternatively, the preset number of the surge is one, the interference device (I) continuously generates two voltage surges or two current surges within 1 second, and the surge control command drives the control unit (D11) to selectively execute the other one of the modes except for the user mode, for example, the reset mode. Or alternatively, when the surge configuration is that there is less than the preset number of surges in the preset time period, the period control command drives the control unit (D11) to selectively execute the other one of the modes except for the user mode. For example, the preset number of the surges is two surges, the interference device (I) generates one voltage surge or one current surge within 1 second, and the surge control command drives the control unit (D11)) to selectively execute the other one of the modes except for the user mode, such as the reset mode.

In another embodiment, even if the surge control command drives the control unit (D11) to selectively execute the other one of the modes except for the user mode, for example, the reset mode. Before the surge control command drives the control unit (D11) to complete the execution of the other one mode (the reset mode), the control unit (D11) still activates and continues to execute the user mode until the surge control command drives the control unit (D11) to complete the execution of the other one mode (the reset mode), and then the control unit terminates the execution of the user mode after the execution of the other one mode (the reset mode) is completed.

In particular, the aforementioned "selectively" means that the user can choose to make "the surge configuration is to generate only a preset number of surges in a preset time period" or "the surge configuration is not the preset number of the surges generated in the preset time period, but the surge control command drives the control unit (D11) to execute the previous user mode or other mode (such as the reset mode).

The reset mode is that the control unit (D11) executes a reset control command stored in the control unit (D11) to reset the IoT device. The reset mode may comprise a factory reset mode, a user-reset mode, and a network reset mode.

The factory reset mode is that the reset control command clears all other data in the memory unit (D14) except for the setting process and the setting information. Next, the reset control command is used to drive the control unit (D11) to acquire the setting process and the setting information stored in the non-volatile memory unit (D141) to execute the first control command, and to store the first result in the memory unit (D14) after the first control command is executed, thus achieving effect of resetting the IoT device, wherein the setting process and the setting information can respectively be the factory setting process and the factory setting information, the factory setting process and the setting information are stored in in the non-volatile memory unit (D141) when the IoT device (D1) is manufactured.

The user-reset mode is that the reset control command first clears the user mode (that is, the second result) that already exists in the memory unit (D14), such as clearing the user setting process and the user name and mobile phone MAC address, as well as the user setting information of providing 30% of the power. Then the network processor (D120) executes the first control command of the control unit (D11) and generates transmitting information to the transmitting unit (D121), and the transmitting unit (D121) sends the transmitting information to the networking control device (N1), wherein the transmitting information includes the information of the first result. The receiving unit (D122) receives receiving information from the external networking control device (N1), and the receiving unit (D122) sends the receiving information to the networking processor (D120). Then the networking processor (D120) converts the receiving information into a second control command, and transmits the second control command to the control unit (D11), then the control unit (D11) executes the second control command, and the control unit (D11) stores a new second result in the memory unit (D14) after executing the second control command.

The network reset mode is that the reset control command only clears the address (mobile phone MAC address) that already exists in the memory unit (D14) which is used to confirm the location of the network device, and then the network processor (D120) executes a pairing command to obtain the address of the networking control device (N1) (e.g. mobile phone) which is used to confirm the location of the network device (e.g. mobile phone MAC address) and store it in the user setting process of the memory unit (D14).

In another embodiment, the modes may also include the user mode, a factory reset mode, and a user-reset mode and a network reset mode.

In another embodiment, the surge configuration may refer to an extent or ratio that the voltage of the power exceeds a preset voltage, or the surge configuration may refer to an extent or ratio that the current of the power exceeds a preset current. The thresholds values are stored in the memory unit (D14), and when the surge configuration is the ratio or extent that the voltage of the power exceeds the preset voltage value and ranges between two adjacent threshold values, the surge control command drives the control unit (D11) selectively execute the preset one of the modes. For example, when the surge configuration is the extent or ratio that the power voltage exceeds a preset voltage value and ranges between a first threshold value and a second threshold value, the surge control command drives the control unit (D11) to selectively execute the user mode of the modes. When the surge configuration is that extent or ratio that the power voltage exceeds a preset voltage and ranges between the second threshold value and a third threshold value, the surge control command drives the control unit (D11) to selectively execute the network reset mode of the modes. When the surge configuration is that extent or ratio that the power voltage exceeds a preset voltage and ranges between the third threshold value and a fourth threshold value, the surge control command drives the control unit (D11) to selectively execute the user-reset mode of the modes. When the surge configuration is that extent or ratio that the power voltage exceeds a preset voltage and ranges between the fourth threshold value and a fifth threshold value, the surge control command drives the control unit (D11) to selectively execute the factory reset mode of the modes. The threshold values in descending order are: the fifth threshold value, the fourth threshold value, the third threshold value, the second threshold value and the first threshold value. Of course, similarly, when the surge configuration is the extent or ratio that the electric current exceeds the preset current and ranges between two adjacent threshold values, the surge control command drives the control unit (D11) to selectively execute the preset one of the modes.

Figure 4:
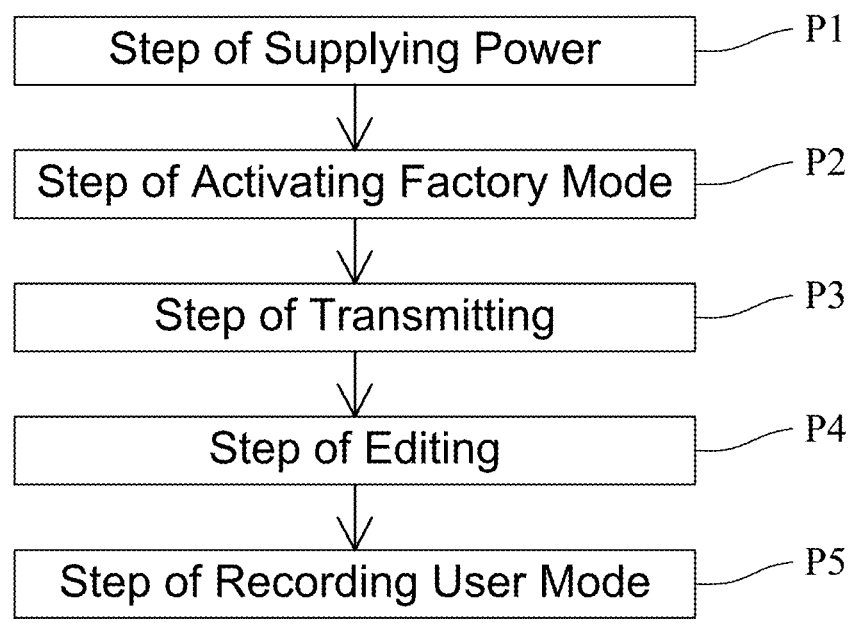
FIG. 4 is a flow chart of a configuring method of an IoT device of the present disclosure.

To put it concretely, after the IoT system is established, a configuring method of the IoT system is executed to configure the IoT system to operate in a factory mode or a user mode. Referring to FIG. 4, the configuring method of the IoT system comprises the following steps.

A step of supplying the power (P1): the power supply device (S1) provides the power to the control unit (D11).

A step of activating the factory mode (P2): the control unit (D11) acquires the factory setting process and the factory setting information stored in the non-volatile memory unit (D141) to execute the first control command, and stores the first result in the volatile memory unit (D142) after the first control command is executed, wherein the first result corresponds to the factory mode.

A step of transmitting (P3): the transmitting unit (D121) transmits the first result to the networking control device (N1).

A step of editing (P4): the user operates the networking control device (N1) via an application (APP) to edit the first result to be the receiving information, the networking control device (N1) transmits the receiving information to the receiving unit (D122), the receiving unit (D122) transmits the receiving information to the networking processor (D120), and then, the networking processor (D120) converts the receiving information to the second control command, and transmits the second control command to the control unit (D11).

A step of recording the user mode (P5): the control unit (D11) executes the second control command, and stores the second result in the volatile memory unit (D142) or the non-volatile memory unit (D141) after the second control command is executed, wherein the second result comprises the user setting process and the user setting information, and the second result corresponds to the user mode.

Figure 5:
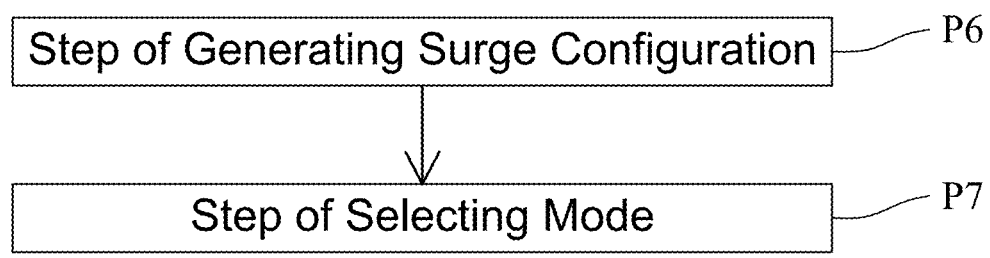
FIG. 5 is a flow chart showing a restarting method of an IoT device of the present disclosure.

In particular, when the step of recording the user mode (P5) is completed, the power supply device (S1) and the control unit (D11) of the IoT device (D1) are maintained in the power supplying state. When the user finds that the IoT device (D1) is shut down, the user can restart the IoT device (D1) according to a restarting method of the IoT device. Please refer to FIG. 5, and the restarting method of the IoT device includes the following steps.

A step of generating the surge configuration (P6): the power supply device (S1) is controlled to switch the control unit (D11) from the power supplying state to the non-power supplying state, for example, turning off the power supply device (S1), and the power supply device (S1) generates a switch surge; next, the power supply device (S1) is controlled to switch the control unit (D11) from the non-power supplying state to the power supplying state, and also to generate the switch surge to the control unit (D11). The two opening and closing surges form the surge configuration. Alternatively, the interference device (I) is caused to generate the surge configuration, and the interference device (I) transmits the surge configuration to the control unit (D11).

A step of selecting mode (P7): the control unit (D11) receives the surge, and then executes the surge control command stored in the control unit (D11), and the surge control command drives the control unit (D11) to selectively execute one of the modes according to the surge configuration, wherein the selected mode is corresponding to the surge configuration. The modes at least include a user mode and a reset mode. When the surge configuration is that there is only a preset number of surges in a preset time period, the surge control command drives the control unit (D11) to selectively execute the user mode among the modes. When the surge control command executes the user mode and generates a fault message, the surge control command drives the control unit (D11) to automatically execute the other one of the modes except for the user mode according to the fault message, such as, the reset mode. When the surge configuration is that there is not a preset number of the surges in the preset time period, the surge control command drives the control unit (D11) to selectively the other one of the modes except for the user mode (such as the reset mode).

Therefore, after the step of selecting mode (P7) is finished, the reset or restart of the IoT device (D1) is completed. The IoT device (D1) of the IoT system does not require the installation of a reset button, and the effect of resetting the IoT device (D1) can still be achieved. Further, even the IoT device (D1) is installed with the reset button, it is not essential that the user must go to the IoT device (D1) to push the reset button to reset IoT device (D1), as mentioned in the prior art.

Although particular embodiments of the present disclosure have been described in detail for purposes of illustration, various modifications and enhancements may be made without departing from the spirit and scope of the present disclosure. Accordingly, the present disclosure is not to be limited except as by the appended claims.

The invention claimed is:

1. An Internet of Things (IoT) system, at least comprising:
a power supply device and an IoT device, wherein the power supply device supplies power to the IoT device via a wired manner or a wireless manner, and the IoT device comprises:
a memory unit, a control unit and a networking unit, wherein the control unit is electrically connected to the memory unit and the networking unit, and the memory unit stores multiple modes;
wherein when the power supply device or an interference device electrically connected to the power supply device generates a surge configuration, the power supply device or the interference device transmits the surge configuration to the control unit, and the control unit executes a surge control command stored in the control unit after receiving the surge configuration, wherein the surge control command drives the control unit to selectively execute one of the modes according to the surge configuration;
wherein the surge configuration is composed of one or multiple surges, the modes comprise a user mode and a reset mode, and when the surge configuration is that there is only a preset number of surges in a preset time period, the surge control command drives the control unit to selectively execute the user mode of the modes.

2. The IoT system according to claim 1, wherein when the surge control command executes the user mode and generates a fault message, the surge control command drives the control unit to automatically execute another one of the modes except for the user mode according to the fault message.

3. The IoT system according to claim 2, wherein the control unit continues to execute the user mode until the surge control command drives the control unit to complete execution of the other one mode, and then the control unit terminates execution of the user mode.

4. The IoT system according to claim 1, wherein when the surge control command executes the user mode and generates a fault message, the surge control command drives the control unit to automatically execute a network reset mode of the reset mode.

5. The IoT system according to claim 1, wherein when the surge configuration is that there is not a preset number of the surges in the preset time period, the surge control command drives the control unit to selectively execute another one of the modes except for the user mode.

6. The IoT system according to claim 5, wherein the control unit starts up and continues to execute the user mode until the surge control command drives the control unit to complete execution of the other one mode, and the control unit terminates execution of the user mode after the surge control command drives the control unit to complete the execution of the other one mode.

7. The IoT system according to claim 1, wherein the reset mode comprises a factory reset mode, a user-reset mode and a network reset mode.

8. The IoT system according to claim 1, wherein the modes comprise a user mode, a factory reset mode, a user-reset mode and a network reset mode.

9. The IoT system according to claim 1, wherein the IoT device is not installed with a reset button.

10. The IoT system according to claim 1, wherein the IoT device comprises an electric unit being electrically connected to the control unit.

11. The IoT system according to claim 10, wherein the control unit executes the first control command to provide full, partial or none of the power.

12. The IoT system according to claim 11, wherein the electric unit is a lamp.

13. The IoT system according to claim 1, wherein the power supply device is a power switch, a power plug, a power socket, a wire connected to a power source or a Power over Ethernet device.

14. An Internet of Things (IoT) system, at least comprising:
a power supply device and an IoT device, wherein the power supply device supplies power to the IoT device via a wired manner or a wireless manner, and the IoT device comprises:
a memory unit, a control unit and a networking unit, wherein the control unit is electrically connected to the memory unit and the networking unit, and the memory unit stores multiple modes;
wherein when the power supply device or an interference device electrically connected to the power supply device generates a surge configuration, the power supply device or the interference device transmits the surge configuration to the control unit, and the control unit executes a surge control command stored in the control unit after receiving the surge configuration, wherein the surge control command drives the control unit to selectively execute one of the modes according to the surge configuration;
wherein the surge configuration is composed of one or multiple surges, the modes comprises a user mode and a reset mode, wherein the networking unit comprises a networking processor, a transmitting unit and a receiving unit, the networking unit is electrically connected to the control unit, the transmitting unit and the receiving unit; wherein the networking processor executes a first control command from the control unit to generate transmitting information to the transmitting unit, and the transmitting unit transmits the transmitting information to exterior via a transmitting manner; the receiving unit receives receiving information from the exterior via a receiving manner, and the receiving unit transmits the receiving information to the networking processor; the networking processor converts the receiving information to a second control command, and transmits the second control command to the control unit, the control unit executes the second control command, and the control unit stores a user setting process and user setting information in the memory unit after the second control command is executed, wherein the user setting process and the user setting information is the user mode.

15. An Internet of Things (IoT) system, at least comprising:
a power supply device and an IoT device, wherein the power supply device supplies power to the IoT device via a wired manner or a wireless manner, and the IoT device comprises:

a memory unit, a control unit and a networking unit, wherein the control unit is electrically connected to the memory unit and the networking unit, and the memory unit stores multiple modes;

wherein when the power supply device or an interference device electrically connected to the power supply device generates a surge configuration, the power supply device or the interference device transmits the surge configuration to the control unit, and the control unit executes a surge control command stored in the control unit after receiving the surge configuration, wherein the surge control command drives the control unit to selectively execute one of the modes according to the surge configuration;

wherein the surge configuration represents an extent or ratio that a voltage of the power is higher than a preset voltage or the surge configuration represents an extent or ratio that a current of the power is higher than a preset current.

16. The IoT system according to claim 15, wherein when the surge configuration represents the extent or ratio that the voltage of the power is higher than the preset voltage and ranged between two adjacent threshold values, the surge control command drives the control unit to selectively execute a preset one of the modes.

17. The IoT system according to claim 15, wherein when the surge configuration represents the extent or ratio that the current of the power is higher than the preset current and ranged between two adjacent threshold values, the surge control command drives the control unit to selectively execute a preset one of the modes.

* * * * *